(12) United States Patent
Muguruma et al.

(10) Patent No.: US 7,366,403 B2
(45) Date of Patent: Apr. 29, 2008

(54) RECORDING APPARATUS, DATA MANAGING APPARATUS AND DATA MANAGING METHOD

(75) Inventors: Kazuhiko Muguruma, Kumagaya (JP); Takamichi Muramatsu, Fukaya (JP); Koichiro Matsuda, Fukaya (JP); Yoko Kuroda, Fukaya (JP); Takashi Narahara, Fukaya (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1032 days.

(21) Appl. No.: 09/949,733

(22) Filed: Sep. 12, 2001

(65) Prior Publication Data
US 2002/0176691 A1  Nov. 28, 2002

(30) Foreign Application Priority Data
May 25, 2001  (JP)  ............................. 2001-157199

(51) Int. Cl.
*H04N 5/91* (2006.01)
(52) U.S. Cl. ........................................ 386/95; 386/125
(58) Field of Classification Search ................ 386/46, 386/83, 95, 125; 725/50
See application file for complete search history.

(56) References Cited

U.S. PATENT DOCUMENTS

| | | | | |
|---|---|---|---|---|
| 5,307,172 A * | 4/1994 | Oh | ............................... | 386/95 |
| 6,215,951 B1 * | 4/2001 | Hailey | .......................... | 386/83 |
| 6,289,169 B1 * | 9/2001 | Okuyama | ..................... | 386/83 |
| 6,642,939 B1 * | 11/2003 | Vallone et al. | ............... | 715/721 |
| 6,801,713 B1 * | 10/2004 | Yagawa et al. | ................ | 386/69 |
| 6,865,746 B1 * | 3/2005 | Herrington et al. | ........... | 725/53 |
| 6,951,031 B2 * | 9/2005 | Hatano | ......................... | 725/50 |

FOREIGN PATENT DOCUMENTS

JP  2001-8148  1/2001

\* cited by examiner

*Primary Examiner*—Huy Nguyen
(74) *Attorney, Agent, or Firm*—Pillsbury Winthrop Shaw Pittman, LLP

(57) ABSTRACT

A recording apparatus which records a plurality of information data pieces in a built-in recording medium is provided with a display which displays a selection screen for selecting additional information pieces for managing a plurality of information data pieces recorded in the recording medium in a corresponding manner with the plurality of information data pieces, and a controller which records an additional information piece selected from the selection screen displayed in the display into the recording medium to correspond to the corresponding information data piece.

15 Claims, 7 Drawing Sheets

RECORDING APPARATUS, DATA MANAGING APPARATUS AND DATA MANAGING METHOD

CROSS-REFERENCE TO RELATED APPLICATIONS

This application is based upon and claims the benefit of priority from the prior Japanese Patent Application No. 2001-157199, filed May 25, 2001, the entire contents of which are incorporated herein by reference.

BACKGROUND OF THE INVENTION

1. Field of the Invention

The present invention relates to an information recording/reproducing system provided with a mass recording or storage device such as, for example, a hard disc drive or the like, and in particular to a recording apparatus, a data managing apparatus and a data managing method for managing recorded data.

2. Description of the Related Art

As well known, in recent years, according to advance of a digital data processing technique, mass storage orientation of a hard disc, cost-reduction thereof, or the like, a video recorder with an built-in HDD (hard Disc Drive) has been developed.

This video recorder with a built-in HDD can be structured so as to receive television broadcasting waves (signals) and convert the television signals into MPEG (Moving Picture Image Coding Experts Group) 2 format to record the same to a hard disc.

According to the video recorder with a built-in HDD, a list of respective programs stored in the hard disc is displayed as a menu screen so that a user can select a program desired freely to look and listen the program or erase it.

Also, in the video recorder with a built-in HDD, such a time shift function can be achieved that, while recording a television program on the air in real time, a user looks and listens the content of the program in a manner where several minutes are delayed.

Now, in the video recorder with a built-in HDD, it is much difficult to exchange hard discs, which is different from a case of exchanging tape cassettes in VTR (Video Tape Recorder), in view of both physical and economical aspects.

For this reason, when the residual quantity for recording in the hard disc built in the video recorder is made less, it is necessary to erase the data of the program which has been recorded in the hard disc in order to record data of a new program.

However, in a case that one video recorder with a built-in HDD is shared by members of a family, even when the list of respective programs which have been recorded on the hard disc is displayed on a screen, it is difficult to make determination about the correspondence relationship between each member of the family and each program which has been recorded, or whether or not the program which has been recorded may be erased, which results in inconvenience in use.

Incidentally, in a system for recording/reproducing information, as a know technique regarding data management carried out when one recording medium is shared by a plurality of users, there is one disclosed in Japanese Patent Application Laid-Open (JP-A) No. 2001-8148 publication.

In the data managing means described in this publication, such a configuration is employed that respective contents which have been recorded on a recording medium are set or attached with passwords so that a management such as an erase restriction or the like is performed.

In such data managing means, however, a password must be set for each program data recording. Therefore, when it is assumed that one video recorder is used in, for example, only one family, there occurs a drawback such as the management is too severe to become inconvenient in handling the video recorder.

BRIEF SUMMARY OF THE INVENTION

The present invention has been made in view of the above circumstances, and an object thereof is to provide a recording apparatus, a data managing apparatus and a data managing method, which allow easy management of a plurality of information pieces recorded in a recording medium and which are made user's handling convenient and are made suitable for practical use.

According to one aspect of the present invention, there is provided a recording apparatus which records a plurality of information data pieces in a recording medium built in the recording device, comprising:

a display which displays a selection screen for selecting additional information pieces for managing a plurality of information data pieces recorded in the recording medium in a corresponding manner with the plurality of information data pieces; and a controller which records an additional information piece selected from the selection screen displayed in the display into the recording medium to correspond to the corresponding information data piece.

According to one aspect of the present invention, there is provided a data managing apparatus which manages a plurality of information data pieces which have been recorded in a recording medium, comprising:

a display which displays a selection screen for selecting additional information pieces for managing a plurality of information data pieces recorded in the recording medium in a corresponding manner with the plurality of information data pieces;

a recorder which records an additional information piece selected from the selection screen displayed in the display into the recording medium to correspond to the corresponding information data piece; and a controller which displays a list of the plurality of information data pieces which have been recorded in the recording medium and displays the additional information pieces which have been recorded in the recording medium to correspond to the plurality of information data pieces which have been displayed in the list.

According to one aspect of the present invention, there is provided a data managing method which manages a plurality of information data pieces which have been recorded in a recording medium, comprising:

a displaying step of displaying a selection screen for selecting additional information pieces for managing a plurality of information data pieces recorded in the recording medium in a corresponding manner with the plurality of information data pieces;

a recording step of recording an additional information piece selected from the selection screen displayed in the displaying step into the recording medium to correspond to the corresponding information data piece; and a control step of displaying a list of the plurality of information data pieces which have been recorded in the recording medium and displays the additional information pieces which have been recorded in the recording medium to correspond to the plurality of information data pieces which have been displayed in the list.

DETAILED DESCRIPTION OF THE INVENTION

Figures 1, 2:
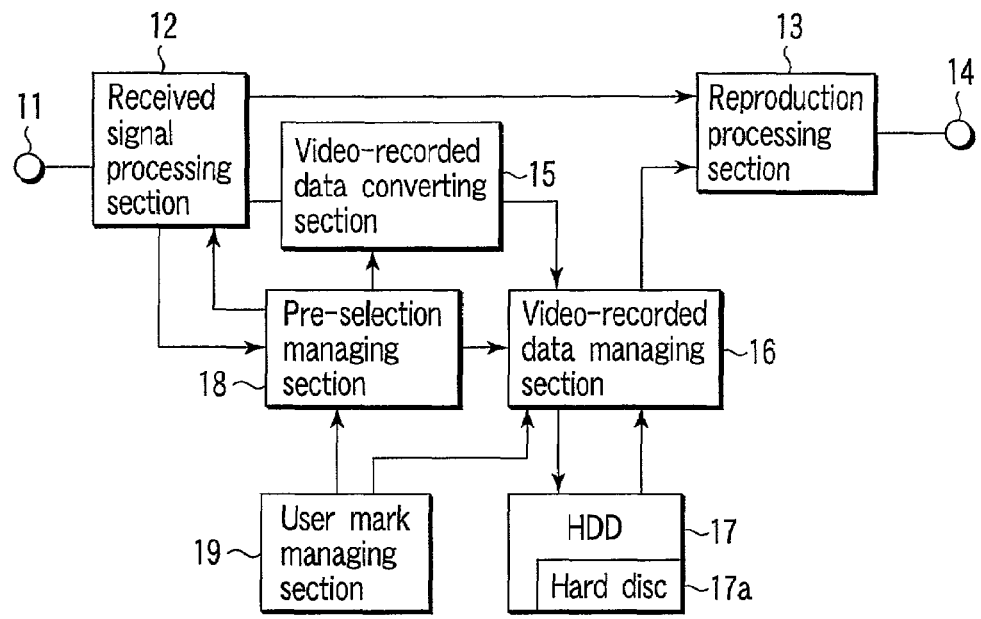
FIG. 1 is a block configuration diagram showing one embodiment of the present invention, for explaining a video recorder with a built-in HDD.
FIG. 2 is a diagram for explaining one example of a display screen of an electronic program list on the basis of EPG data according to the above embodiment.

One embodiment of the present invention will be explained below in detail with reference to the drawings. FIG. 1 shows a video recorder with a built-in HDD which can receive a digital television broadcasting.

That is, a television signal supplied to an input terminal 11 is supplied to a received signal processing section 12 to be subjected to demodulation processing. After the demodulated signal is supplied to a reproduction processing section 13 to be subjected to reproduction processing, the reproduced signal is taken out via an output terminal 14 externally to be applied for screen display.

Also, the television signal which has been demodulated in the received signal processing section 12 is supplied to an image recording data converting section 15 where the signal is converted to a signal with a form suitable for recording in a hard disc 17a.

Thereafter, the television signal output from the image recording data converting section 15 is supplied to an image recording data managing section 16 where, after an instruction about a recording position on the hard disc 17a is received, the television signal is recorded in the hard disc 17a.

Incidentally, when EPG (Electronic Program Guide) data showing a list of programs to be scheduled for broadcasting is contained in the television signal which has been subjected to modulation processing, the received signal processing section 12 supplies the EPG data to a pre-selection managing section 18 to record the data therein.

Also, the video recorder with a built-in HDD is provided with a user mark managing section 19. Stored in the user mark managing section 19 is an user additional information piece which a user can record together with data piece of a program and the hard disc 17.

This user additional information piece is data for displaying an icon showing, for example, a user name or the degree of importance (which shows whether data should be pre-selected or may be erased) of program data which has been recorded in the hard disc 17a.

In the video recorder with a built-in HDD configured in the above manner, operation thereof will be explained below. First, a user displays an electronic program list such as shown in FIG. 2 on the basis of the EPG data which has been recorded in the pre-selection managing section 18.

Figure 3:
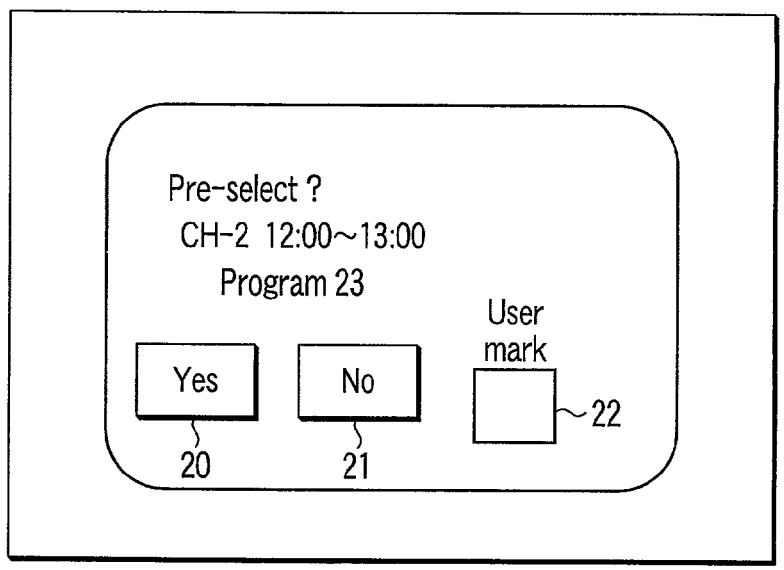
FIG. 3 is a diagram for explaining one example of a confirmation screen for confirming whether or not a program selected from the electronic program list in the above embodiment should be pre-selected for recording.

Then, when the user selects program 23 from the electronic program list, for example, a screen for demanding a confirmation about whether or not the program 23 selected should be pre-selected for recording is displayed as shown in FIG. 3.

In the confirmation screen shown in FIG. 3, when a choice "YES" 20 is selected, pre-selection for recording to the program 23 has been completed, but when a choice "NO" 21 is selected, the current screen 10 is returned back to the display of the electronic program list shown in FIG. 2.

Figure 4:
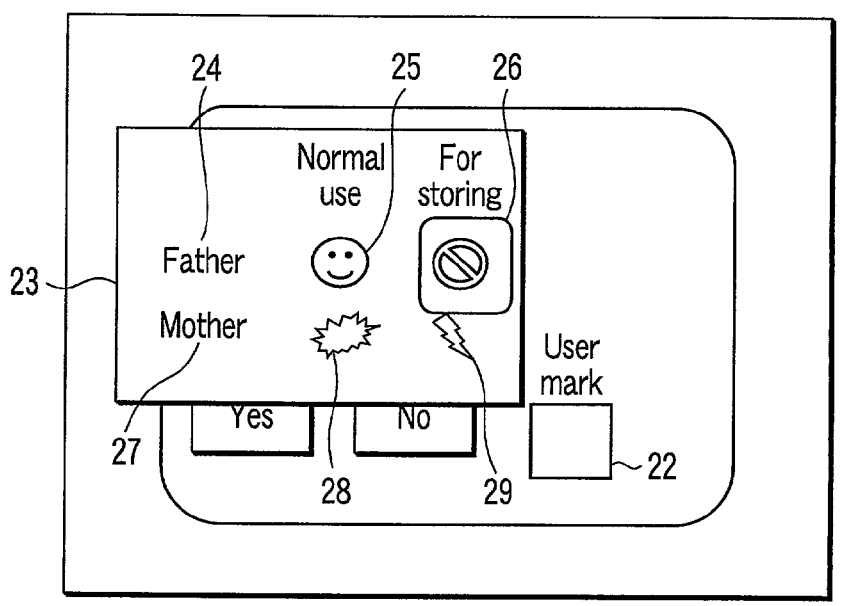
FIG. 4 is a diagram for explaining one example of a user mark selection screen for selecting user additional information in the above embodiment.

Also, in the confirmation screen shown in FIG. 3, when a choice "USR MARK" 22 is selected, the pre-selection managing section 18 inputs the user additional information piece which has been stored in the user mark managing section 19 to display a user mark selection screen 23 as shown in FIG. 4 in an overlapping manner on the confirmation screen shown in FIG. 3.

On the user mark selection screen 23 in a list manner, displayed so as to correspond to a user name "father" 24 of a first user are user additional information pieces such as an icon 25 showing the degree of importance "normal level (erasable)" to a program which has been recorded by the first user, an icon 26 showing the degree of importance "storing level (not erased)" to a program which has been recorded by the first user and the like, and displayed so as to correspond to another user name "mother" 27 of a second user are user additional information pieces such as an icon 28 showing the degree of importance "normal level (erasable)" to a program which has been recorded by the second user and an icon 29 showing the degree of importance "storing level (not erased)" to a program which has been recorded by the second user and the like.

Incidentally, in the user mark selection screen 23 shown in FIG. 4, two kinds of "normal level" and "storing level" has been displayed as the degree of importance to a program which has been recorded. Alternatively, the user mark selection screen 23 may be set in a multi-stage manner by adding a level showing a looked and listened program and the like.

It is assumed that the user has selected the icon 26 showing the degree of importance "storing level" corresponding to the user name "father" of the first user from the user mark selection screen 23.

Figure 5:
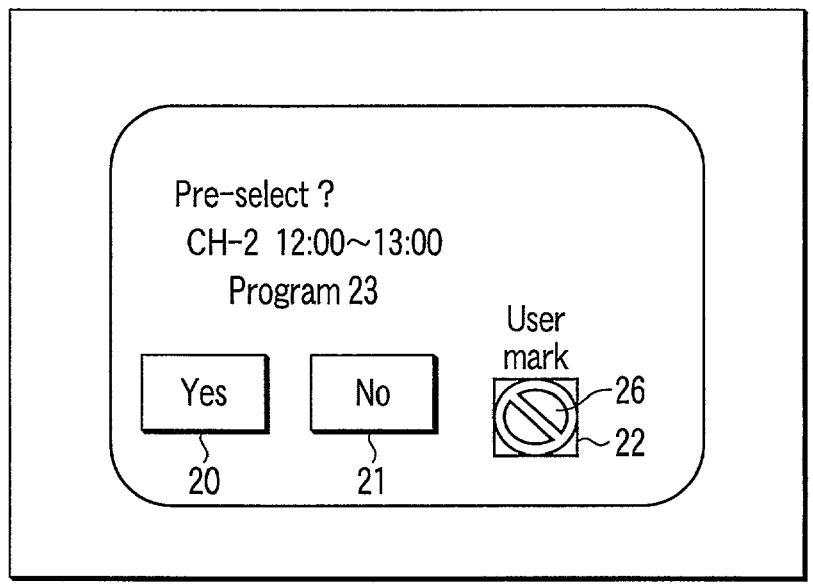
FIG. 5 is a diagram for explaining another example of a confirmation screen for confirming whether or not a program selected from the electronic program list in the above embodiment should be pre-selected for recording.

Then, the pre-selection managing section 18 turns off the display of the user mark selection screen 23 and displays the original confirmation screen, as shown in FIG. 5. At this time, the icon 26 showing the degree of importance "storing level" previously selected is displayed on a field of the choice "user mark" 22.

In the confirmation screen shown in FIG. 5, when the choice "NO" 21 is selected, the current screen is returned back to the electronic program list shown in FIG. 2, but when the choice "YES" 20 is selected, the pre-selection for recording is decided to the program 23.

Figure 6:
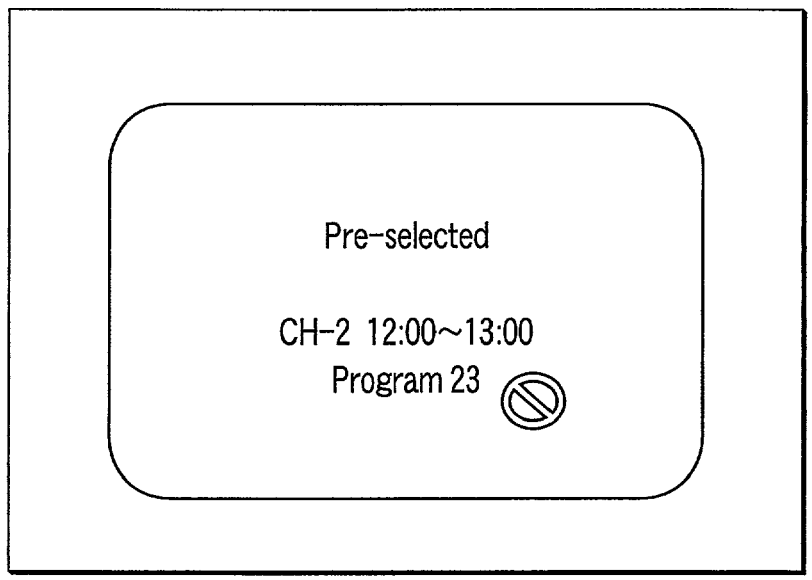
FIG. 6 is a diagram for explaining one example of a confirmation screen for displaying that the pre-selection for recording has been decided in the above embodiment.

In a case that this choice "YES" 20 has been selected, as shown in FIG. 6, a confirmation screen showing that the pre-selection for recording has been decided is displayed. Thus, the operation for recording pre-selection conducted by a user is completed.

Incidentally, in the above-mentioned operation for recording, the example where video-recording is conducted by selecting a predetermined program 23 from the EPG data to pre-select recording of the program 23 has been shown. However, for example, a user may conduct a video-recording pre-selection operation such as direct inputting of a broadcasting data and time and channel of a program, he/she may conduct another video-recording pre-selection operation such as inputting of a specific number or symbol which can discriminate a program, and he/she can conduct video-recording operation for recording a program which is being looked by him/her.

Also, the user additional information piece selected by the above video-recording operation is means for presenting a user name of a recorded program or the degree of importance of the program, or the both. In this embodiments, a plurality of the icons 25, 26, 28 and 29 are used as the user additional information pieces, but the additional information piece may be displayed using a color or a letter.

Then, after the pre-selection for video-recording is completed, when the pre-selected time is reached, the pre-selection managing section 18 controls the received signal processing section 12, the video-recorded data converting section 15, and the video-recorded data managing section 16 to record data of the video-recording pre-selected program to the hard disc 17a via the HDD 17.

At this time, the pre-selection managing section 18 is configured such that it can record the previously selected user additional information piece (the icon 26 showing the degree of importance "storing level" corresponding to the user name "father" 24 of the first user or the like) in the hard disc 17a so as to correspond to the data of the program.

Figure 7:
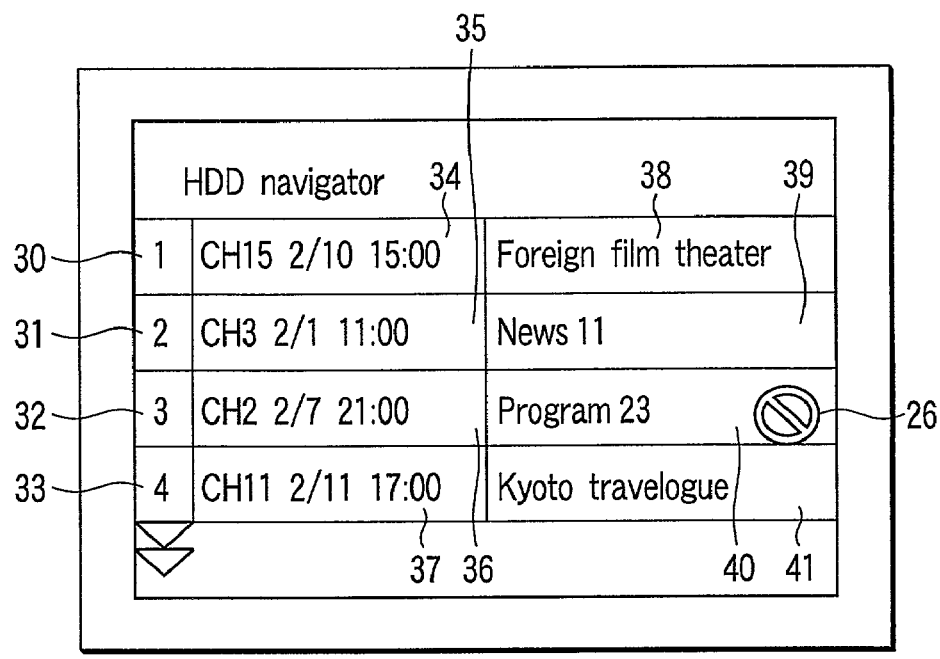
FIG. 7 is a diagram for explaining one example of a list screen of programs which have been recorded in a hard disc in the embodiment.

Next, when the program data which has been recorded in the hard disc 17a in the above manner is reproduced, as shown in FIG. 7, the list of the programs which have been recorded in the hard disc 17a is first displayed. This list screen can be created by the video-recorded data managing section 16 reading the recorded information from the hard disc 17a.

Included in this list screen are managing numbers of recorded programs 30 to 33, channels and recorded dates/times of the recorded programs 34 to 37, titles of the recorded programs 38 to 41 and the like.

On the above list screen, displayed in the program 23 added with the user additional information piece by the user is also the icon 26 showing the degree of importance "storing level" of the program 23.

For this reason, the user displays the list screen of the program data which has been in the hard disc 17a to confirm the user additional information piece attached to the program on the list screen so that he/she can easily determine a person who recorded the program, and the degree of importance of the program.

In FIG. 7, for example, it can easily be judged according to the shape of the icon 26 added to the program 23 that the program 23 has been recorded by the first user of the user name "father" and it has the degree of importance of "unerasable".

Incidentally, in the above explanation, such a configuration is shown that, when the data of the program is recorded in the hard disc 17a, the user additional information piece is simultaneously recorded so as to correspond to the program. However, for example, a user can select a predetermined program from the list screen shown in FIG. 7 to set a user additional information piece to the program, change the user additional information piece or delete the same.

Figure 8:
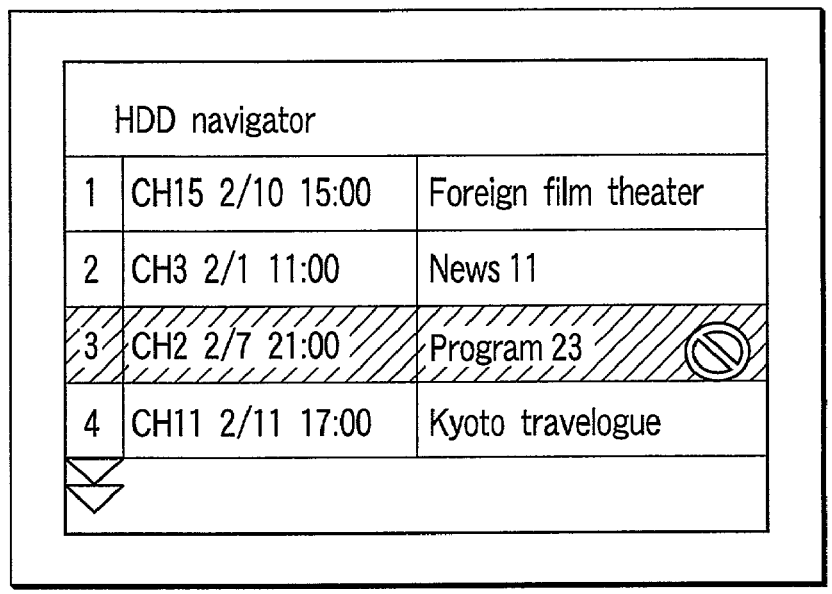
FIG. 8 is a diagram for explaining one example of an index for selecting a program from the list screen in the embodiment.

On the above list screen, as shown in FIG. 8, one program of a plurality of programs displayed in a list manner is different in color from the remaining programs, which serves as an index for selecting a program. In this case, a user operates a upwardly/downwardly scrolling key (not shown) to change the position of the index so that he/she can select a desired program.

Figure 9:
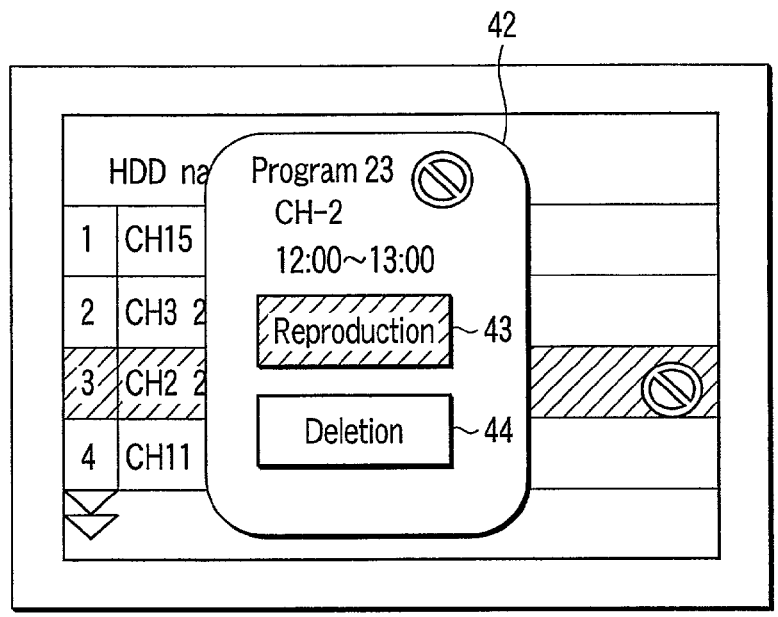
FIG. 9 is a diagram for explaining one example of an operation screen for selecting reproduction/deletion of a program which has been recorded in the hard disc in the embodiment.

Thus, when the program 23 added with the icon 26 showing the degree of importance "storing level" is selected and decided, the video-recorded data managing section 16 displays an operation screen 42 such as shown in FIG. 9 on the list screen in an overlapping manner.

In this operation screen 42, there have been displayed a choice "reproduction" 43 and a choice "deletion" 44. When the choice "reproduction" 43 is selected, the reproduction of the program 23 starts.

When the reproduction of this program 23 starts, the video-recorded data managing section 16 reads out the data of the recorded program 23 from the hard disc 17a to supply the same to the reproduction processing section 13. Then, the reproduction processing section 13 performs reproduction processing on the data of the input program 23 to send it externally via the output terminal 14. Thus, it is made possible for a user to look and listen the selected program 23.

Figure 10:
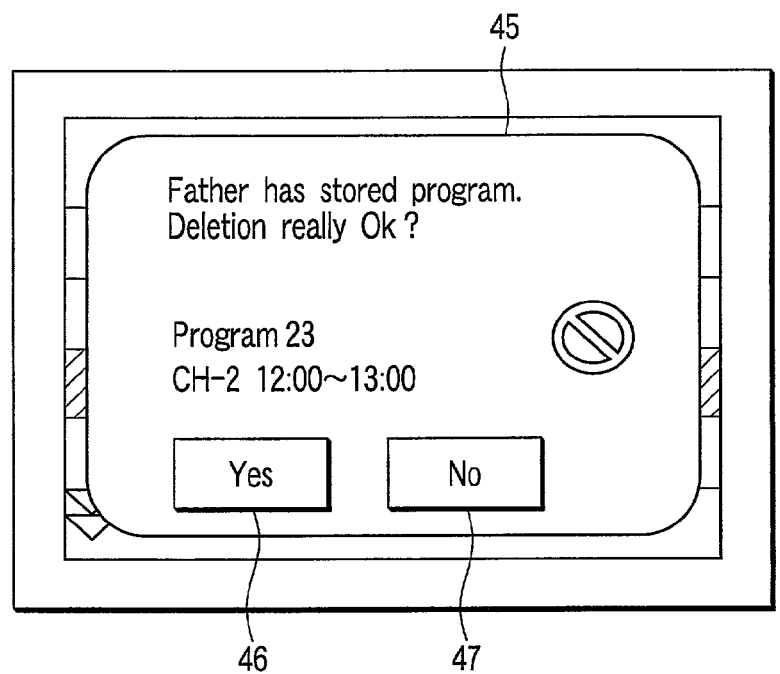
FIG. 10 is a diagram for explaining one example of a confirmation screen about whether or not data of a program which has been recorded in the hard disc in the embodiment.

On the other hand, when the choice "deletion" 44 is selected, since the program 23 whose deletion has been requested is attached with the icon 26 showing the degree of importance "storing level", the video-recorded data managing section 16 creates and displays a confirmation screen 45 for confirming whether or not the data of the recorded program 23 may be erased actually, as shown in FIG. 10.

On this confirmation screen 45, there have been displayed a choice "YES" 46 and a choice "NO" 47. When the choice "YES" 46 is selected, the video-recorded data managing section 16 deletes the data of the program 23 from the hard disc 17a via the HDD 17. Also, when the choice "NO" 47 is selected, the video-recorded data managing section 16 returns the screen back to the operation screen 42 shown in FIG. 9.

Thus, when the deletion of the data of the program 23 attached with the icon 26 showing the degree of importance "storing level" is requested, the confirmation screen 45 for confirming whether or not the data of the program 23 can be deleted really, so that such a possibility that important program data is deleted erroneously can be reduced.

Also, when it is made possible to set the degree of importance of the recorded program to multiple stages of three kinds or more, for example, it is made possible to set a password to only a program with the highest degree of importance, so that such a configuration can be employed that the program can not be deleted and the user additional information piece attached to the program can not be changed to another one unless authentication is performed by the password.

Figure 11:
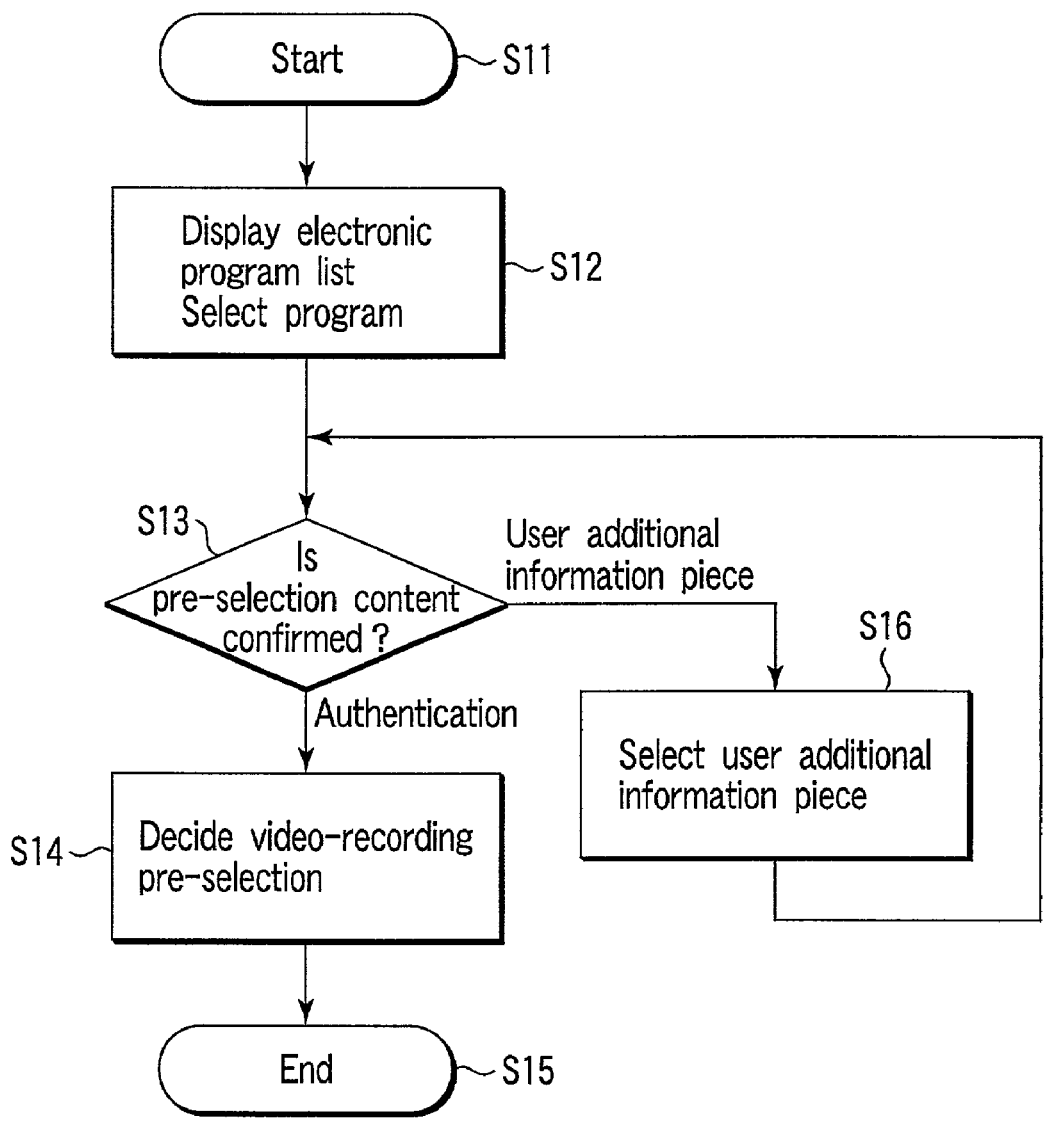
FIG. 11 is a flowchart for schematically explaining an operation of pre-selection recording in the embodiment.

FIG. 11 shows a flowchart showing operations for pre-selection recording which have been explained with reference to FIGS. 2 to 6 collectively. First, when control routine starts (Step S11), the pre-selection managing section 18 displays the electronic program list (FIG. 2) on the basis of the EPG data in Step S12 to allow a user to select his/her desired program.

Thereafter, the pre-selection managing section 18 displays the screen (FIG. 3) for demanding the user to confirm whether or not the selected program should be pre-selected for video-recording. On the confirmation screen, judgement is made in Step S13 about whether or not the user has approved the pre-selection of the program or whether or not the addition of a user additional information piece is requested.

When the program pre-selection has been approved, the pre-selection managing section 18 determines the video-recording pre-selection in Step S14, and displays the confirmation screen (FIG. 6) showing that the video-recording pre-selection has decided so the control routine is terminated (Step S15).

Also, when addition of the user additional information piece is requested in Step S13, after the pre-selection managing section 18 displays the user mark selection screen 23 (FIG. 4) to allow the user to select a desired user additional information piece in Step S16, the control routine is returned back to the judgement processing in Step S13. In this case, the confirmation screen shown in FIG. 5 is displayed in Step S13.

Figure 12:
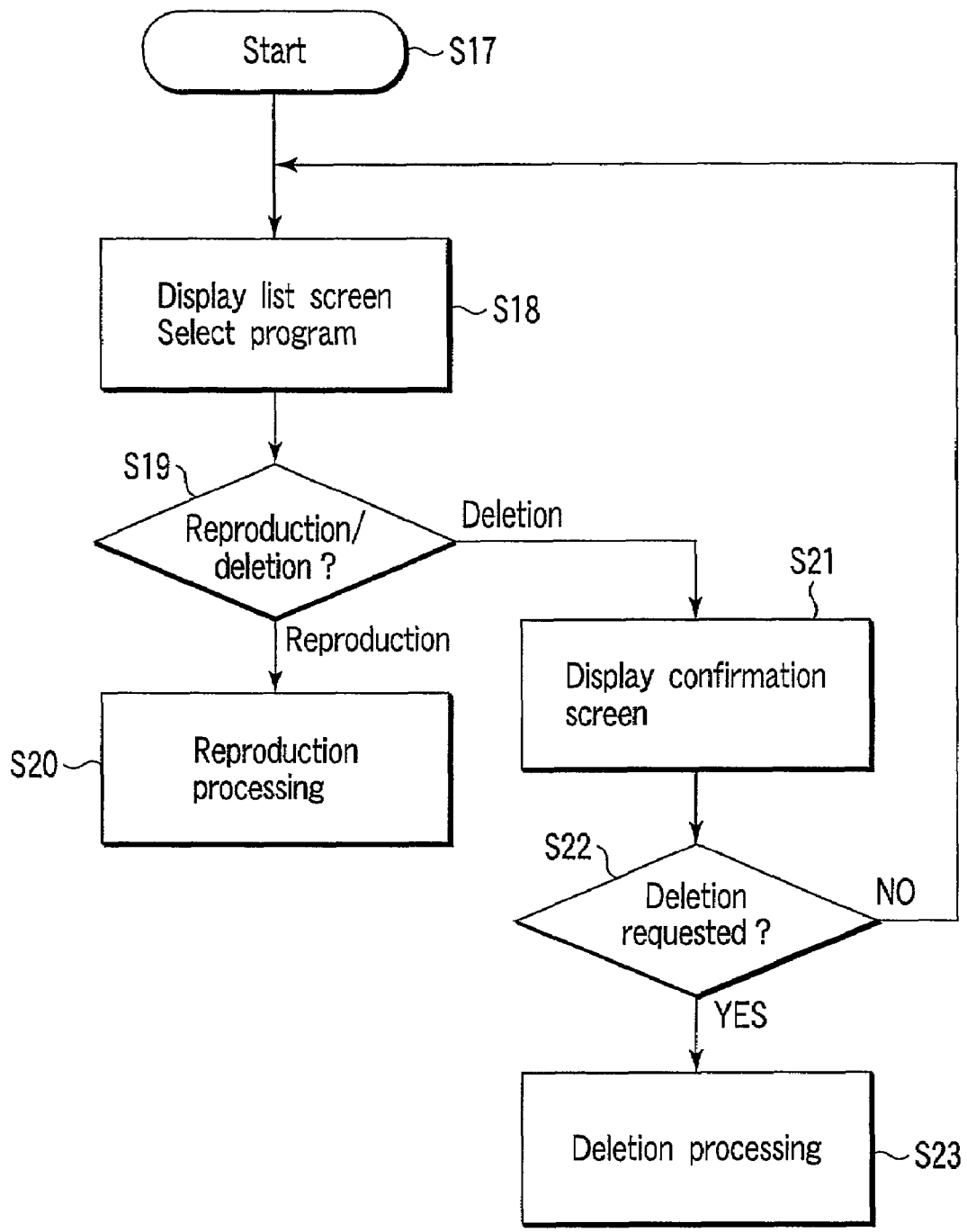
FIG. 12 is a flowchart for schematically explaining an operation of reproduction or playback in the embodiment.

FIG. 12 shows a flowchart showing reproducing operations which have been explained with reference to FIGS. 7 to 10. First, when control routine starts (Step S17), the video-recorded data managing section 16 displays the list screen (FIG. 7) of the programs which have been recorded in the hard disc 17a in Step S18 to allow a user to select his/her desired program, as shown in FIG. 8.

When the program is selected, the video-recorded data managing section 16 displays the operation screen 42 (FIG. 9) for selecting reproduction or deletion in Step S19. When the reproduction is selected, the reproducing processing of the program starts in Step S20.

Also, when the deletion is selected in Step S19, the video-recorded data managing section 16 displays the confirmation screen 45 (FIG. 10) for confirming whether the recorded program data may be deleted really while displaying the degree of importance in Step S21.

Thereafter, the video-recorded data managing section 16 judges whether or not the deletion is required on the confirmation screen 45 in Step S22. When the deletion is not required (NO), the control routine is returned back to the processing in Step S18, but when the deletion is required (YES), the deleting processing is performed in Step S23.

Incidentally, in the above explanation, the example where the hard disc 17a is employed as the recording medium for recording the program data has been shown. However, in the present invention, a writable/erasable recording medium such as, for example, a DVD (Digital Versatile Disc), a magnetic tape or the like can be used as the recording medium.

Also, by rearrange the order of the programs displayed on the list screen using the user additional information piece as a parameter, it is possible to facilitate the selection of a program from the list screen of a user.

What is claimed is:

1. A recording apparatus which records a plurality of information data pieces into a built-in recording medium, comprising:
   a display which displays a selection screen configured to enable a user to select from a plurality of additional information pieces in order to manage a plurality of information data pieces recorded in the recording medium; and
   a controller configured to record, in the recording medium, a selected additional information piece selected from the selection screen that corresponds to an associated information data piece,
   wherein, when the plurality of information data pieces includes program s recorded in the recording medium and the selected additional information pieces include erasure restriction information that restricts erasure of one of the programs recorded in the recording medium and identity of a user that selected the erasure restriction information, and
   wherein, upon the controller receiving instructions to erase the recorded program associated with the erasure restriction information, the controller directs the display to indicate that the erasure of the recorded program is restricted and the identity of the users that selected the erasure restriction information.

2. The recording apparatus according to claim 1, wherein the additional information piece includes one of an information piece for discriminating a user to the information data piece and an information piece for showing the degree of importance of the information data piece.

3. The recording apparatus according to claim 1, wherein the additional information piece is an infomiation piece for displaying a plurality of kinds of marks.

4. The recording apparatus according to claim 1, wherein the recording medium is a hard disc.

5. A recording apparatus which records a plurality of information data pieces to a built-in recording medium, comprising:
   display means for displaying a selection screen configured to enable a user to select from a plurality of additional information pieces in order to manage a plurality of information data pieces recorded in the recording medium; and
   control means for recording, in the recording medium, a selected additional information piece selected from the selection screen hat corresponds to an associated information data piece, wherein, when the plurality of information data pieces includes programs recorded in the recording medium and the selected additional information pieces include erasure restriction information that restricts erasure of one of the programs recorded in the recording medium and identity of a user that selected the erasure restriction information, and
   wherein, upon the control means receiving instructions to erase the recorded program associated with the erasure restriction information, the control means directs the display means to indicate that the erasure of the recorded program is restricted and the identity of the users that selected the erasure restriction information.

6. A data managing apparatus which manages a plurality of information data pieces which have been recorded in a recording medium, comprising:
   a display which displays a selection screen configured to enable a user to select from a plurality of additional information pieces in order to manage a plurality of information data pieces recorded in the recording medium;

a recorder configured to record, in the recording medium, a selected additional information piece selected from the selection screen that corresponds to an associated information data piece; and a controller configured to display a list of the plurality of information data pieces which have been recorded in the recording medium and to display the selected additional information pieces which have been recorded in the recording medium that correspond to the plurality of information data pieces which have been displayed in the list, wherein, when the plurality of information data pieces includes programs recorded in the recording medium and the selected additional information pieces include erasure restriction information that restricts erasure of one or more of the programs recorded in the recording medium and identity of users that selected the erasure restriction information, and wherein, upon the controller receiving instructions to erase any of the recorded programs associated with the erasure restriction information, the controller directs the display to indicate that the erasure of the recorded programs is restricted and the identity of the users that selected the erasure restriction information.

7. The data managing apparatus according to claim 6, wherein the additional information piece includes one of an information piece for discriminating a user to the information data piece and an information piece for showing the degree of importance of the information data piece.

8. The data managing apparatus according to claim 6, wherein the additional information pieces are information pieces for displaying a plurality of kinds of marks.

9. The data managing apparatus according to claim 6, wherein the recording medium is a hard disc.

10. The data managing apparatus according to claim 6, further comprising an editor which allows addition, change and deletion of the additional information piece to each of the plurality of information data pieces displayed in the list.

11. A data managing apparatus according to claim 6, further comprising a confirmation screen display which displays a confirmation screen for confirming whether or not the information data piece displayed with an additional information piece showing the degree of importance may be deleted from the plurality of information data pieces which have been displayed in the list in a state where the deletion has been required from the recording medium.

12. A data managing apparatus which manages a plurality of information data pieces which have been recorded in a recording medium, comprising:

display means for displaying a selection screen that enables a user to select from a plurality of additional information pieces in order to manage a plurality of information data pieces recorded in the recording medium;

recording means for recording, in the recording medium, a selected additional information piece selected from the selection screen that corresponds to an associated information data piece; and control means for displaying a list of the plurality of information data pieces which have been recorded in the recording medium and for displaying the selected additional information pieces which have been recorded in the recording medium that correspond to the plurality of information data pieces which have been displayed in the list, wherein, when the plurality of information data pieces includes programs recorded in the recording medium and the selected additional information pieces include erasure restriction information that restricts erasure of one or more of the programs recorded in the recording medium and identity of users that selected the erasure restriction information, and wherein, upon the control means receiving instructions to erase any of the recorded programs associated with the erasure restriction information, the control means directs the display means to indicate that the erasure of the recorded programs is restricted and the identity of the users that selected the erasure restriction information.

13. A data managing method which manages a plurality of information data pieces which have been recorded in a recording medium, comprising:

displaying a selection screen that enables a user to select from a plurality of additional information pieces in order to manage a plurality of information data pieces recorded in the recording medium;

recording, in the recording medium, a selected additional information piece selected from the selection screen that corresponds to an associated information data piece; and displaying a list of the plurality of information data pieces which have been recorded in the recording medium and the selected additional information pieces which have been recorded in the recording medium that correspond to the plurality of information data pieces which have been displayed in the list, wherein, when the plurality of information data pieces includes programs recorded in the recording medium and the selected additional information pieces include erasure restriction information that restricts erasure of one or more of the programs recorded in the recording medium and identity of users that selected the erasure restriction information, and wherein, upon receiving instructions to erase any of the recorded programs associated with the erasure restriction information, displaying that the erasure of the recorded programs is restricted and the identity of the users that selected the erasure restriction information.

14. The data managing method according to claim 13, further comprising allowing addition, change and deletion of the additional information piece to each of the plurality of information data pieces displayed in the list.

15. The data managing method according to claim 13, further comprising displaying a confirmation screen for confirming whether or not the information data piece displayed with an additional information piece showing ihe degree of importance may be deleted from the plurality of information data pieces which have been displayed in the list in a state where the deletion has been required from the recording medium.

* * * * *